United States Patent
Bergman et al.

(10) Patent No.: US 7,083,024 B2
(45) Date of Patent: Aug. 1, 2006

(54) THREE-POINT ENGINE MOUNT

(75) Inventors: Ron Bergman, McIntosh, MN (US); Donn Eide, Thief River Falls, MN (US)

(73) Assignee: Arctic Cat Inc., Thief River Falls, MN (US)

(*) Notice: Subject to any disclaimer, the term of this patent is extended or adjusted under 35 U.S.C. 154(b) by 0 days.

(21) Appl. No.: 10/224,858

(22) Filed: Aug. 20, 2002

(65) Prior Publication Data

US 2004/0035633 A1 Feb. 26, 2004

(51) Int. Cl.
*B60K 1/00* (2006.01)
(52) U.S. Cl. .................. 180/291; 180/190; 180/312
(58) Field of Classification Search ............... 180/190, 180/228, 299, 312, 182, 291; 280/124.109; 248/674, 637
See application file for complete search history.

(56) References Cited

U.S. PATENT DOCUMENTS

| | | | | |
|---|---|---|---|---|
| 2,662,988 A | * | 12/1953 | McKim | 310/91 |
| 3,705,701 A | * | 12/1972 | Hunt | 248/544 |
| 3,747,879 A | * | 7/1973 | Houk | 248/609 |
| 3,869,017 A | * | 3/1975 | Feustel et al. | 180/232 |
| 3,889,782 A | * | 6/1975 | Geis | 187/237 |
| 3,985,192 A | * | 10/1976 | Samuelson et al. | 180/190 |
| 4,237,996 A | * | 12/1980 | Matsuda et al. | 180/229 |
| 4,270,625 A | * | 6/1981 | Nishimura et al. | 180/291 |
| 4,407,383 A | * | 10/1983 | Enokimoto et al. | 180/291 |
| 4,520,890 A | * | 6/1985 | Marier | 180/193 |
| 4,613,006 A | * | 9/1986 | Moss et al. | 180/9.25 |
| 4,633,964 A | * | 1/1987 | Boyer et al. | 180/190 |
| 4,848,503 A | * | 7/1989 | Yasui et al. | 180/190 |
| 4,917,207 A | * | 4/1990 | Yasui et al. | 180/193 |
| 5,060,745 A | * | 10/1991 | Yasui et al. | 180/193 |
| 5,172,786 A | * | 12/1992 | Ishibashi et al. | 180/190 |
| 5,474,146 A | * | 12/1995 | Yoshioka et al. | 180/184 |
| 5,630,575 A | * | 5/1997 | Koyanagi et al. | 267/140.3 |
| 5,660,245 A | * | 8/1997 | Marier et al. | 180/190 |
| 5,685,387 A | * | 11/1997 | Rioux et al. | 180/190 |
| 5,944,133 A | * | 8/1999 | Eto | 180/190 |
| 5,992,552 A | * | 11/1999 | Eto | 180/190 |
| 6,032,754 A | * | 3/2000 | Izumi et al. | 180/190 |
| 6,056,080 A | * | 5/2000 | Clavel | 180/291 |
| 6,371,229 B1 | * | 4/2002 | Kakiuchi | 180/65.2 |
| 6,464,033 B1 | * | 10/2002 | Izumi et al. | 180/291 |
| 6,561,302 B1 | * | 5/2003 | Karpik | 180/291 |
| 6,595,311 B1 | * | 7/2003 | Fournier et al. | 180/228 |
| 6,604,600 B1 | * | 8/2003 | Fournier et al. | 180/299 |
| 6,907,951 B1 | * | 6/2005 | Schoenfelder | 180/190 |
| 2002/0029920 A1 | * | 3/2002 | Fournier et al. | 180/300 |
| 2002/0117342 A1 | * | 8/2002 | Schoenfelder et al. | 180/182 |

FOREIGN PATENT DOCUMENTS

JP 06072157 A * 3/1994

* cited by examiner

*Primary Examiner*—Christopher P. Ellis
*Assistant Examiner*—Kelly E. Campbell
(74) *Attorney, Agent, or Firm*—Black Lowe & Graham, PLLC

(57) ABSTRACT

An engine mount system for connecting an engine to a chassis, includes a mounting plate and first, second and third engine mounts. The first engine mount secures a first engine side to a first side of the chassis. The second and third engine mounts secure the mounting plate to the chassis. The mounting plate is also secured to a second side of the engine and is configured to mount a drive shaft of the engine and a driven shaft of a vehicle transmission system.

20 Claims, 4 Drawing Sheets

THREE-POINT ENGINE MOUNT

BACKGROUND OF THE INVENTION

This invention relates to an engine mount system for a straddle-mounted vehicle. More particularly, the invention relates to an engine mount system for a snowmobile that connects the engine to the chassis at three locations.

Snowmobiles are a widely used means of transportation in snowy regions. They are especially popular for recreational purposes such as trail riding or racing. V-belt type continuously variable transmissions are typically used in snowmobiles to transfer power from an engine to a drive track. Variable transmissions include a drive shaft with an attached drive clutch and a driven shaft with an attached driven clutch.

In a typical arrangement, multiple engine mounts connect the engine to the chassis, and the drive shaft and the driven shaft are separately connected to the snowmobile chassis. A shortcoming of this arrangement is that it allows "play" between the engine and the variable transmission. Play in the system directly affects the engine's ability to transfer power to the transmission, especially under heavy loads such as during acceleration, and contributes to additional vehicle vibrations.

An improved system that decreases vibrations and reduces play between the snowmobile engine and the variable transmission would be advantageous for improving acceleration and efficient power transfer and reducing vehicle vibrations.

SUMMARY OF THE INVENTION

Generally, the present invention relates to engine mount systems for mounting an engine to a vehicle chassis. One embodiment of an engine mount system for connecting an engine to a chassis includes a mounting plate and first, second and third engine mounts. The first engine mount secures a first engine side to a first side of the chassis. The second and third engine mounts secure the mounting plate to the chassis. The mounting plate is also secured to a second side of the engine and is configured to mount a drive shaft of the engine and a driven shaft of a vehicle power transmission system.

A method of mounting an engine to a chassis includes securing a first engine side to a first chassis side with a first engine mount and securing a mounting plate to the chassis with second and third engine mounts. The method also includes securing an engine second side to the mounting plate and mounting a drive shaft of the engine and a driven shaft of a vehicle power transmission system to the mounting plate.

The above summary of the present invention is not intended to describe each embodiment or every implementation of the present invention. The Figures and the detailed description that follow more particularly exemplify these embodiments.

DETAILED DESCRIPTION OF THE PREFERRED EMBODIMENTS

This invention relates to an engine mount device for a straddle-mounted vehicle. The invention relates particularly to a snowmobile where the engine mount device mounts an engine to a chassis using three engine mounts. Furthermore, the engine drive and driven shafts are connected to the chassis through a common mounting device. The embodiments, as hereinafter detailed, should not be interpreted as limiting the breadth of potential uses in other vehicles or in other commercial fields of endeavor for other intended purposes.

Figure 1:
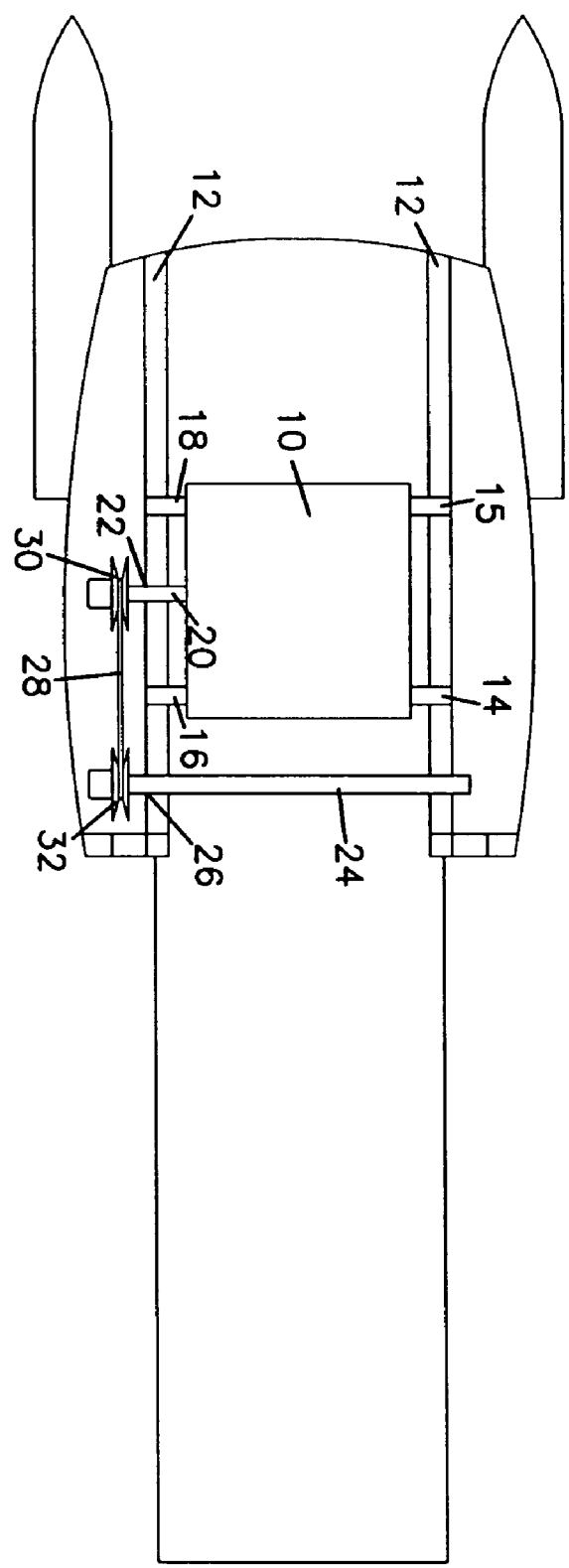
FIG. 1 is a schematic to view of an assembled snowmobile with an engine mounted to a chassis as is known in the art.

The prior art teaches an engine 10 mounted to a chassis 12 at multiple locations such as with engine mounts 14, 15, 16, and 18 shown in FIG. 1. A drive shaft 20 extends from one side of engine 10 and separately connects to chassis 12 at a shaft mount 22. A driven shaft 24 is also connected to chassis 12 at a shaft mount 26. Power is transferred from engine 12 through drive shaft 20 to driven shaft 24 via a drive belt 28 that extends between a drive clutch 30 secured to drive shaft 20, and a driven clutch 32 secured to driven shaft 24.

According to this and other engine mounting arrangements taught in the art, a measurable amount of play exists between the drive and driven shafts when operating the vehicle. This "play" is due, in part, to the drive shaft and the driven shaft being mounted separately to the chassis. As the chassis vibrates, expands, contracts and is otherwise distorted during vehicle use, the distance and relationship between the drive and driven shafts may vary, causing increased vibrations in the system and a reduction in power transfer from the drive to the driven shaft.

Another shortcoming of the prior art is related to engine mounts 14, 15, 16 and 18. The engine mounts of the prior art fail to adequately provide shock absorption of forces generated between the engine and the chassis during vehicle use. The present invention, as disclosed herein and illustrated in FIGS. 2–5, addresses these deficiencies.

Throughout the remainder of this detailed description, common features as those shown in FIG. 1 will be referenced with the same or similar reference numerals in order to clarify the description of the drawings.

Figure 2:
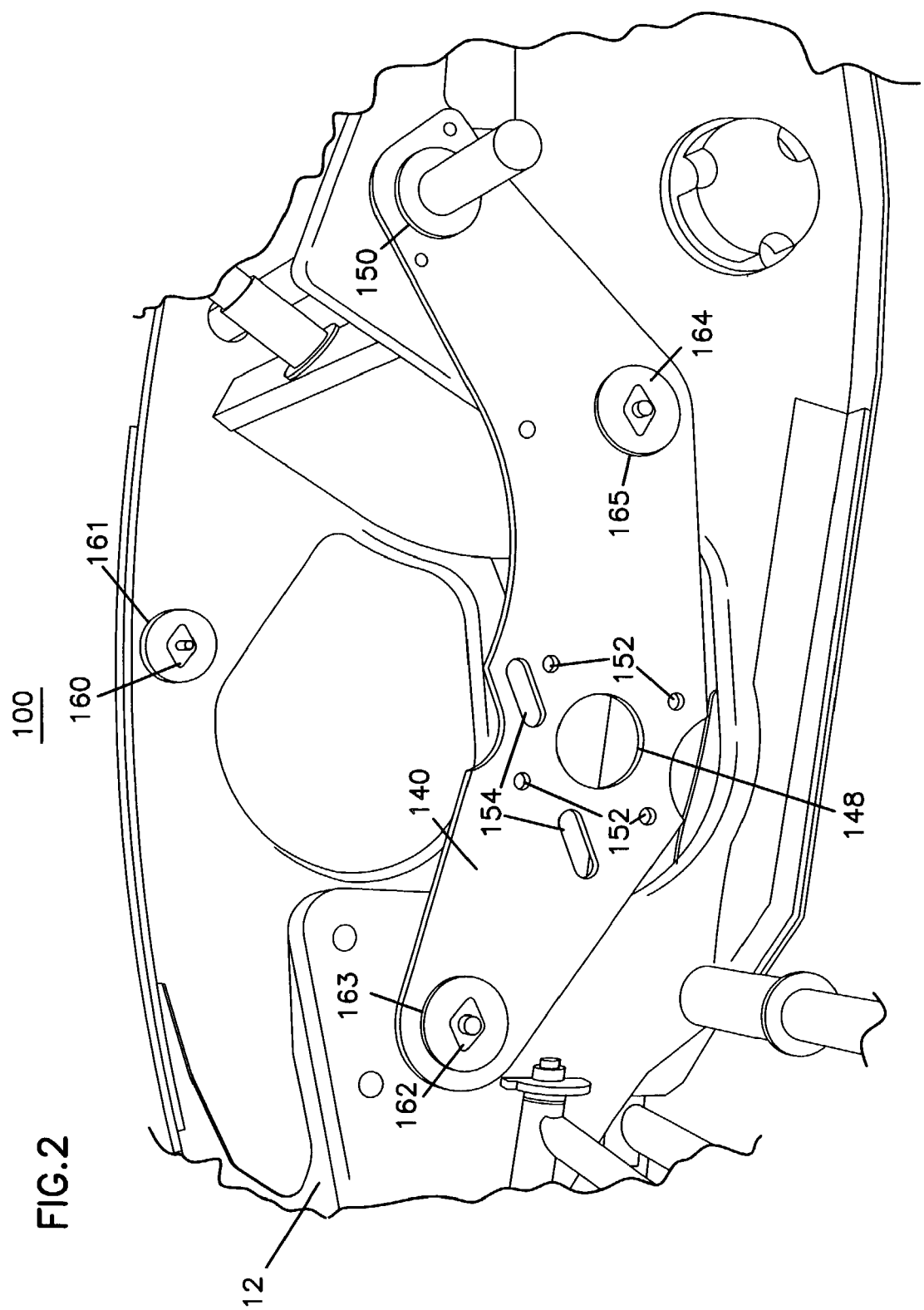
FIG. 2 is a schematic partial perspective view of a snowmobile chassis having an engine mount device according to the invention.

On embodiment of the present invention includes an engine mount system 100 for mounting an engine to a chassis of a vehicle. System 100 includes a mounting plate 140 and engine mounts 160, 162 and 164, as shown in FIG. 2. Mounting plate 140 includes a first shaft mount aperture 148 for receiving a drive shaft from the engine, and a second shaft mount aperture 150 for receiving a driven shaft of the power transmission system of the vehicle. Further, holes 152 and slots 154 are formed in the mounting plate for the purpose of securing the engine to mounting plate 140.

Apertures 161, 163, and 165 are associated with each of the engine mounts 160, 162 and 164, respectively. Greater detail concerning mounting plate 140 is discussed with reference to FIGS. 4 and 5.

The engine mount system 100 attaches the engine to the chassis at three locations, preferably at opposing sides of the engine. It is advantageous to attach an engine to a chassis at opposing sides of the chassis for the purposes of stability and reduction of vibrations. The position of engine mounts 160, 162 and 164 on chassis 112 represent advantageous mounting locations for the embodiment shown and described in FIGS. 2 and 3. However, the placement of engine mounts on a chassis may vary widely according to the design and application of the vehicle and its associated engine mount system. According to engine mount system 100, a single engine mount 160 is placed on a side of chassis 112 opposite the side of the chassis where engine mounts 162 and 164 are located. Two engine mounts 162 and 164 are used in this embodiment in part for the purpose of providing additional engine stability on the side of the engine where the drive shaft functions. Engine mounts 162 and 164 are also used for the purpose of providing a stable connection of mounting plate 140 to chassis 112. Engine mount 164 is positioned on mounting plate 140 at the particular location illustrated in FIG. 2 to provide a connecting point for mounting plate 140 to the chassis between the drive and driven shaft mount apertures 148 and 150. Furthermore, engine mounts 162 and 164 are positioned on mounting plate 140 at the location shown in FIG. 2 in part because of the design and shape of chassis 112.

Engine mounts 162 and 164 may also function to isolate mounting plate 140 from chassis 112. The term "isolation" as used herein may include physical separation as well as providing suspension or shock absorption between two parts. As applied to the present invention, isolation between mounting plate 140 and chassis 112 may be accomplished by an engine mount, such as engine mounts 162 and 164, that provides physical separation and suspension between the mounting plate and the chassis.

Figure 3:
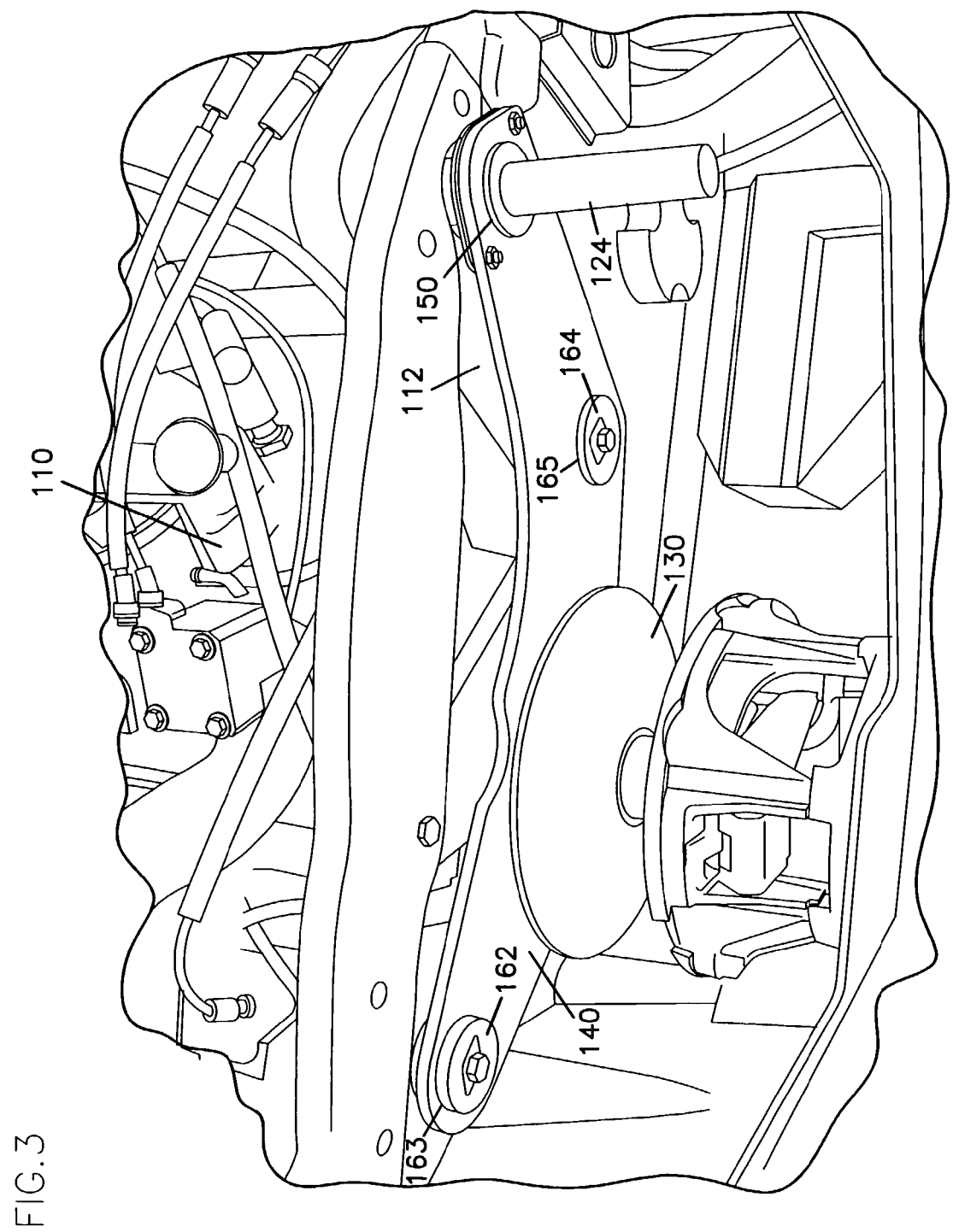
FIG. 3 is a schematic top perspective view of a portion of a snowmobile engine, chassis and engine mount device according to the invention.

Engine mount system 100 is further illustrated in the partial top perspective view of FIG. 3. FIG. 3 illustrates an engine 110 mounted in chassis 112 and connected to mounting plate 140. Engine mounts 162 and 164 mount the mounting plate 140 to chassis 112. The first shaft mount aperture 148 (not shown) receives a drive shaft (not shown). A drive clutch 130 is attached to the drive shaft. The second shaft mount aperture 150 receives a driven shaft 124 of the vehicle's power transmission system. When the power transmission system is completely assembled, a driven clutch is attached to driven shaft 124. Engine 110 is secured to mounting plate 140 with fasteners that extend through apertures 152 and 154 in mounting plate 140. Engine mount 160 (not shown in FIG. 3) also secures engine 110 to chassis 112.

Figure 4:
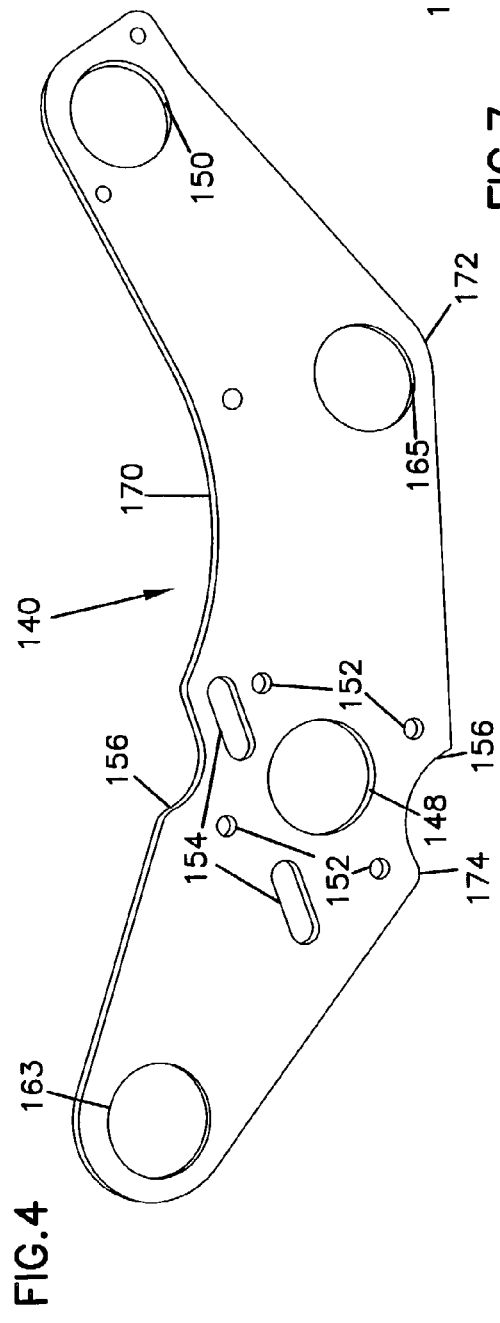
FIG. 4 is a schematic front view of a mounting plate according to the invention.

FIG. 4 is a front view of mounting plate 140 of the embodiment illustrated in FIGS. 2 and 3. Mounting plate 140 includes first and second shaft mount apertures 148 and 150, fastener apertures 152 and 154, and engine mount apertures 163 and 165. Mounting plate 140 also includes recessed areas 156 around a periphery of the mounting plate as well as angled portions 170, 172 and 174 that help define the shape of mounting plate 140.

The size and shape of mounting plate 140, and the many apertures formed within are specifically designed for this embodiment of the invention. However, many different shapes and sizes of the mounting plate itself and the apertures formed within it are possible. The invention should be interpreted to include all shapes and sizes of mounting plate 140, and the apertures formed within it, as well as the position of the mounting plate on a vehicle chassis.

The shape of mounting plate 140, as illustrated in FIGS. 2-5, was derived in large part to be compatible with the chassis design to which it is mounted. A further design consideration for mounting plate 140 is the need for weight reduction of all components of the vehicle. Thus, mounting plate 140 includes angles portions 170, 172 and 174 as a result of reducing the size of the plate to its minimum without compromising the structural integrity of the plate.

Structural integrity of mounting plate 140 must also be considered when forming apertures in the plate. For example, engine mount aperture 163 and second shaft mount aperture 150 would optimally be placed at the very far extremes of mounting plate 140, or in other words at its end surface. However, a certain amount of material must be present between the absolute end surface of the plate and the aperture in the plate so that the engine mount or shaft for which the mounting plate is secured to will have sufficient mounting plate surface area to interface with in order to fulfill that feature's intended purpose without the mounting plate failing. Thus, as used throughout the application, when a feature is described as being at "an end" or a "side" of mounting plate 140, it is intended that the feature is spaced a sufficient distance from that end or side surface to provide for the necessary structural integrity to be maintained.

As viewed in FIGS. 2 and 4, fastener apertures 152 and 154 are arranged for receiving fasteners to fasten mounting plate 140 to engine 110. These apertures may be formed in plate 140 in a variety of arrangements and sizes. In the engine mount system illustrated in FIGS. 2–4, apertures 152 and 154 are arranged near or around first shaft mount aperture 148. This type of arrangement provides for an easy way to mount engine 110 to mounting plate 140 at a location near drive shaft 120, which is extending from the engine through the mounting plate.

Figure 6:
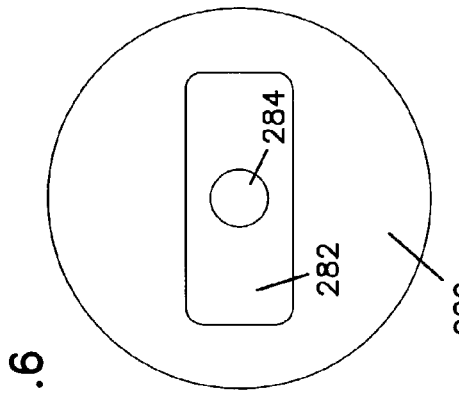
FIG. 6 is a schematic front view of an alternative embodiment of an engine mount of the invention.
Figure 5:
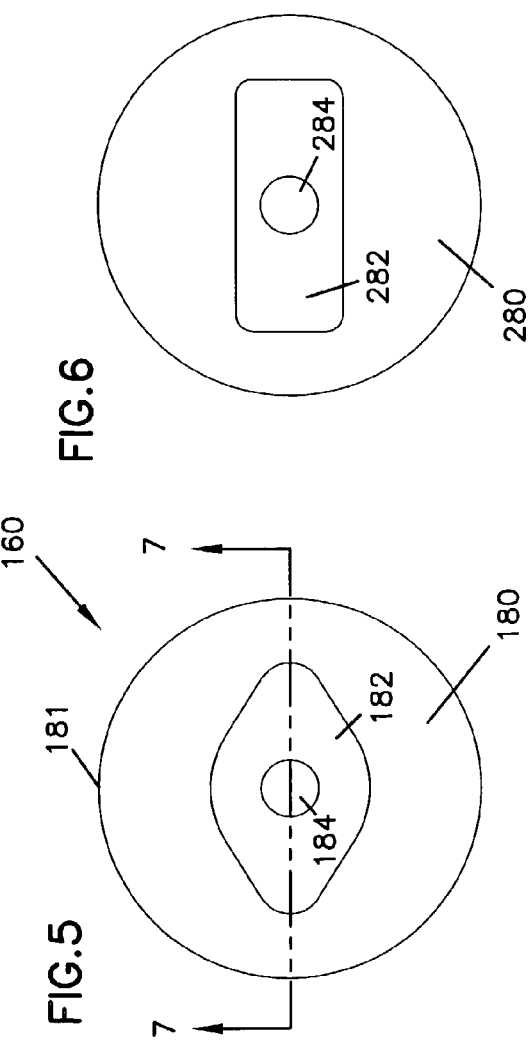
FIG. 5 is a schematic front view of an engine mount of the invention.

The engine mounts 160, 162 and 164, illustrated in FIG. 2, are configured in a way to provide optimum shock absorption as well as providing a secure connection of the engine to a vehicle chassis. A front view of an engine mount 160 is illustrated in FIG. 5. The engine mount includes shock absorbing material 180 and fastener components 182 and 184. Shock absorbing material 180 may be rubber or another material having properties of high shock absorption and durability. Fastener component 182 is shaped so that there is more shock absorbing material vertically between the fastener component 182 and an outer surface 181 of the engine mount than the amount of material horizontally between component 182 and outer surface 181 of the engine mount. The shape and size of component 182 may vary so long as there is more shock absorbing material vertically than there is horizontally within the engine mount. FIG. 6 illustrates an alternative fastener component 282 that engages shock absorbing material 280 and is mounted to chassis 112 with a fastener component 184.

Figure 7:
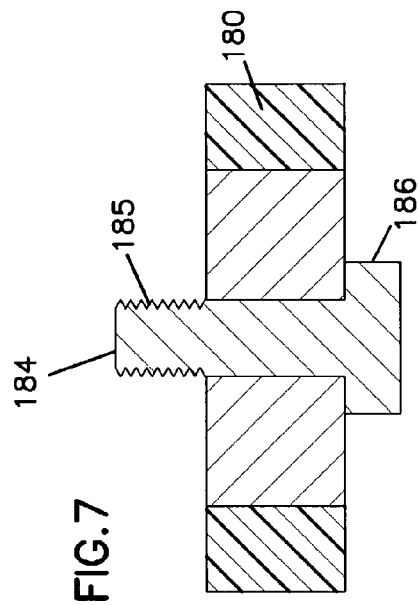
FIG. 7 is a schematic cross-sectional view of the engine mount of FIG. 5.

Fastener component 184 is used in part to connect the engine mount to the chassis or mounting plate to which it is attached. Fastener components 182 and 184 may be separate components or may be formed into the same component. FIG. 7 is a cross-sectional view of the engine mount of FIG. 5 illustrating fastener components 182 and 184 as separately formed where fastener component 184 is a bolt with a thread shaft portion 185 and a head portion 186. Fastener component 182 may have a variety of different shapes, such as, for example, a rhombus, oval, circle, triangle, rectangle, or the like shape.

Engine mounts 160, 162 and 164 are configured to provide additional shock absorption in the vertical direction because of the greater frequency and magnitude of forces acting in the vertical direction in a typical vehicle as compared to the forces in the horizontal direction. However, in alternative embodiments, the engine mounts may be configured to provide maximum shock absorption in the horizontal direction rather than the vertical direction, equal amounts of shock absorption in all directions, or greater shock absorption in the vertical direction as shown and illustrated in FIGS. 2–7. The shock absorbing material 180 may be configured in a circular shape or in a shape different from a circle, for example, an oval, rectangle, rhombus, triangle, or the like, so long as the engine mount provides the intended shock absorbing function for that particular embodiment.

Alternative engine mount embodiments may include additional fastener components or combinations of two or more shock absorbing materials or pieces of shock absorbing material. The shape of the fastener components may also vary depending on the requirements of the application to which the engine mount is applied. For example, the component 182 may be positioned in the engine mount so that there is more shock absorbing material horizontally between fastener component 182 and an outer surface 181 of the engine mount than the amount of material vertically between component 182 and outer surface 181. This configuration may be particularly useful in an application where the size or frequency of forces in the horizontal direction is greater than those forces in the vertical direction.

Mounting plate 140 is intended to mount both a drive shaft and a driven shaft. Mounting both shafts to the same plate provides advantages over the prior art because the shape of the mounting plate and the distance between shaft apertures 163 and 165 fixes the distance between the shafts. A mounting system with a fixed distance between the shafts reduces the amount of play in the system that is inherent in an engine mounting system that mounts the shafts separately to the chassis. Reduction in the amount of play contributes significantly to a reduction in vibrations as well as increased efficiency in transferring power and torque from the drive shaft to the driven shaft and vice versa.

In a further alternative embodiment of the present invention, mounting plate 140 and engine 110 may be secured to chassis 112 by conventional means, for example, by fasteners rather than by engine mounts with suspension features. However, due to the configuration of mounting plate 140, a measurable decrease in vehicle vibrations and an increase in power transfer efficiency may be attained because the drive and driven shafts are fixed a predetermined distance apart by the mounting plate.

The above specification, examples and data provide a complete description of the manufacture and use of the composition of the invention. Since many embodiments of the invention can be made without departing from the spirit and scope of the invention, the invention resides in the claims hereinafter appended.

We claim:

1. An engine mount system for connecting an engine and continuously variable transmission to a chassis, the engine including an engine drive shaft, the continuously variable transmission having a driven shaft propelled by a belt extending from the drive shaft, the system comprising;
   a mounting plate;
   a first engine mount securing a first engine side to a chassis first side, the first engine side being secured to the chassis first side without a mounting plate disposed therebetween, the first engine mount including an elastic vibration damping material; and
   a second and third engine mount securing the mounting plate to a chassis second side, the second and third engine mounts including an elastic vibration damping material;
   wherein a second engine side is rigidly mounted to the mounting plate and the mounting plate comprises a first aperture rotatably receiving the engine drive shaft and a second aperture rotatably receiving a driven shaft of a vehicle power transmission, the engine drive shaft bearing drive sheaves of the continuously variable transmission and the driven shaft bearing driven sheaves of the continuously variable transmission.

2. The system of claim 1 wherein the mounting plate comprises a front half and a back half, and wherein the second engine mount is held by the front half of the mounting plate and the third engine mount is held in the back half of the mounting plate.

3. The system of claim 2 wherein the engine drive shaft is mounted to the front half of the mounting plate and the driven shaft is mounted to the back half of the mounting plate.

4. The system of claim 1 wherein the mounting plate is configured for fastening to the second engine side.

5. The system of claim 1 wherein the first, second and third engine mounts comprise a shock absorbing material and a fastener retained within the shock absorbing material.

6. The system of claim 5 wherein the fastener is rhombus-shaped.

7. The system of claim 5 wherein the engine mounts have a shape relative to the fastener that there is more shock absorbing material between the fastener and vertical boundaries of the engine mount than the amount of shock absorbing material between the fastener and horizontal boundaries of the engine mount.

8. The system of claim 7 wherein the engine mounts are circular-shaped.

9. A snowmobile, comprising;
   a chassis having a first side and a second side;
   an engine having a first side and a second side; and
   the engine mount system of claim 1.

10. A method of mounting an engine to a chassis, the method comprising;
    securing a first engine side to a first chassis side with a first engine mount, without a mounting plate disposed between the first chassis side and the first engine side, the first engine mount including an elastic vibration damping material;
    securing a mounting plate to the chassis with a second and third engine mounts, the second and third engine mounts including an elastic vibration damping material; and
    rigidly securing a second engine side to the mounting plate, the mounting plate having a first aperture adapted to receive a drive shaft extending laterally out of the engine and a second aperture adapted to receive a driven shaft of a vehicle power transmission system, the drive shaft bearing drive sheaves of a continuously variable transmission and the driven shaft bearing driven sheaves of the continuously variable transmission.

11. The method of claim 10 wherein the mounting plate comprises a front half and a back half, and wherein the step of securing the mounting plate to the chassis includes securing a front half of the mounting plate to the chassis with a second engine mount and securing a back half of the mounting plate to the chassis with a third engine mount.

12. The method of claim 11 wherein mounting the drive shaft includes mounting to a front half of the mounting plate and wherein mounting the driven shaft includes mounting to a back half of the mounting plate.

13. The method of claim 10 wherein the step of securing an engine second side to the mounting plate includes fastening the engine to the mounting plate through holes in the mounting plate.

14. The method of claim 10 wherein mounting the drive shaft includes extending the drive shaft through the first aperture in the mounting plate and mounting the driven shaft includes extending the driven shaft through second aperture.

15. An engine mount system for connecting an engine to a chassis, the system comprising;
    a mounting plate;
    a first engine mount including an elastic vibration damping material securing a first engine side directly to a chassis first side; and
    a second and third engine mount including an elastic vibration damping material securing the mounting plate to a chassis second side;
    wherein a second engine side is directly rigidly mounted to the mounting plate and the mounting plate comprises apertures receiving a drive shaft extending out of the engine and a driven shaft of a vehicle power transmission system, the drive shaft bearing drive sheaves of a continuously variable transmission and the driven shaft bearing driven sheaves of the continuously variable transmission.

16. The system of claim 15, wherein the second engine side is on an opposing side of the engine from the first engine side.

17. An engine mount system configured to connect a vehicle engine to a chassis of the vehicle and to connect a drive shaft of the engine to a drive shaft of a transmission of the vehicle, the engine including first and second opposing sides and the chassis including first and second sides positioned adjacent to respective first and second opposing sides of the engine, the system comprising;
    a mounting plate; and
    first, second and third engine mounts including an elastic vibration damping material;
    wherein the first engine mount connects the first side of the engine to the first side of the chassis, the second and third engine mounts connect the mounting plate to the second side of the chassis, the second side of the engine is rigidly connected to the mounting plate, and the drive shaft and the driven shafts are extending rotatably through the mounting plate, the drive shaft bearing drive sheaves of a continuously variable transmission and the driven shaft bearing driven sheaves of the continuously variable transmission.

18. The system of claim 17, wherein the first engine mount is at least partially embedded in the first side of the chassis.

19. The system of claim 18, wherein the second and third engine mounts are at least partially embedded within the mounting plate.

20. The system of claim 18, wherein the first side of the engine is directly connected to the first side of the chassis with the first engine mount, the second side of the engine is directly connected to the mounting plate, and the mounting plate is directly connected to the second side of the chassis with the second and third engine mounts.

* * * * *